Nov. 29, 1932.   R. E. COTTON   1,889,639
WINDOW SHADE CONTROL
Filed Feb. 8, 1932
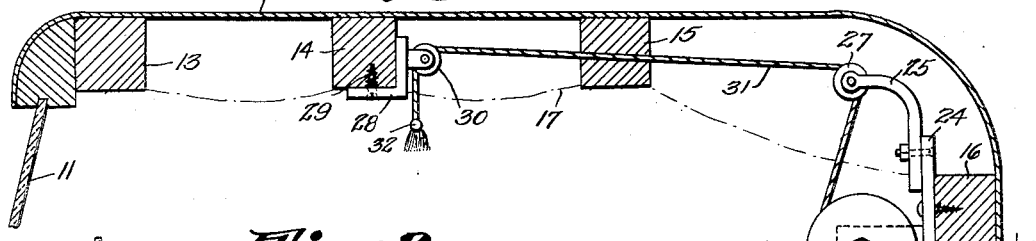
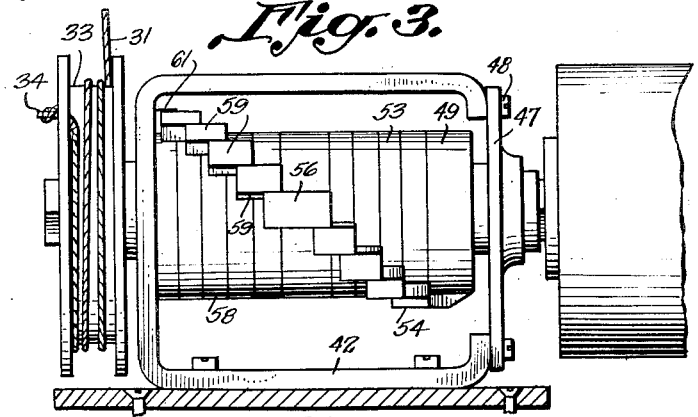
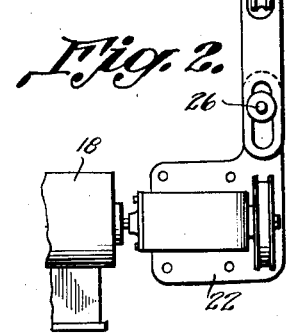
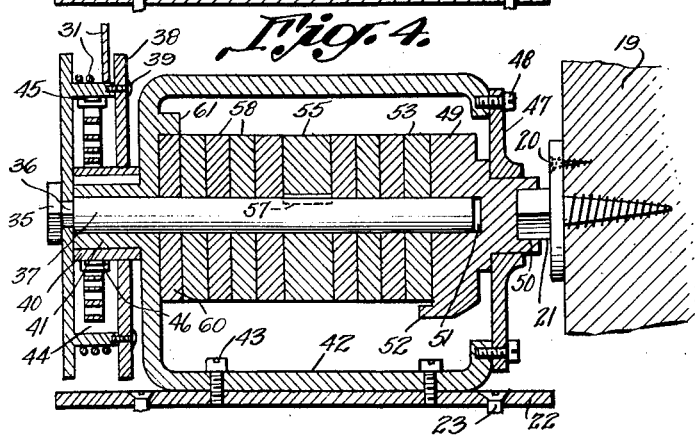
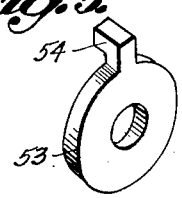
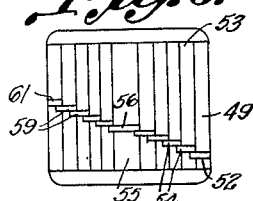
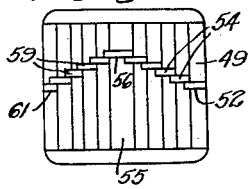
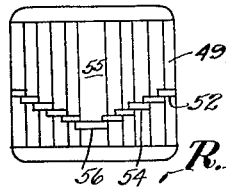
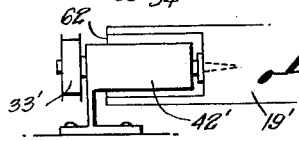
Inventor
R. E. Cotton
By Miller & Miller
Attorneys Patented Nov. 29, 1932

1,889,639

UNITED STATES PATENT OFFICE

ROBERT E. COTTON, OF CHATTANOOGA, TENNESSEE

WINDOW SHADE CONTROL

Application filed February 8, 1932. Serial No. 591,749.

This invention relates to a window shade control and has for an object to provide a window shade control whereby a window shade may be operated from a distance.

A further object of this invention is to provide a distant window shade control especially useful in an automobile or other vehicle where a person at a distance from the window shade may raise or lower the rear shade at will.

Yet another object of this invention is to provide a window shade control which will control the shade from a distance and will not interfere with the normal operation of the shade being raised or lowered in the usual manner.

Yet a further object of this invention is to provide a window shade control operated by a cord, the end of which shall be conveniently located to the driver of the vehicle so that he may reach up and pull the cord to operate the shade without the necessity of interfering with his normal driving operation or distracting his attention from the road and wherein the end of the cord will always return to the same position close to the roof of the vehicle whether the shade is up or down.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a view showing the operation of this invention, taking the sections through the top of the automobile.

Figure 2 is a front elevation of this device.

Figure 3 is an enlarged rear view.

Figure 4 is a section taken on line 4—4 of Figure 1.

Figure 5 is a perspective of one of the washers showing the cog mounted thereon.

Figures 6, 7, and 8 are diagrammatical views showing various positions of the cogs, and Figure 9 is a modification showing the invention embedded in the curtain roll.

There is shown at 10 the roof of an automobile or other vehicle having the usual front windshield 11, rear window 12, frame supporting members, 13, 14, 15, and 16, and inside lining 17, the lining 17 being secured in the usual manner to the frame supporting members 13, 14, 15, and 16.

The usual window shade 18 is mounted so that it may be lowered to cut off the glare or view through the rear window 12. This shade 18 has the usual shade roller 19 having the conventional pawl and ratchet arrangement and spring, (all not shown) at the left as viewed in Figure 2, for operating the shade in the usual manner. The usual conventional bracket for operating this pawl, ratchet and spring arrangement is provided at the other end of the shade roller 19 and secured in the same left hand of the frame support 16. Screwed into the right hand of the roller 19 is a stud screw 20 having a squared end 21, the squared end 21 cooperating with the control mechanism for pivotally supporting shade roller 19. The screw 20 is anchored by a lock screw through a hole in the flange 20'.

A base 22 is secured to the frame support 16 as by screws 23 and a finger 24 projecting behind the lining 17 forms a support for adjacently securing a bent arm 25 by means of a bolt 26, the arm 25 rotatably supporting a pulley 27 in the end thereof. A bracket 28 secured as at 29 to the frame support 14, supports another pulley 30 behind the lining 17, the pulleys 27 and 30 serving as a friction elimination means for the control cord 31, the operator's end 32 of the cord projecting there through a small opening in the lining. As will be apparent, the end 32 of the cord is in a position to be convenient to the driver of the vehicle so that he has merely to reach up his hand and seize and operate the same.

The other end of the cord 31 passes through an opening in the lining near the rear of the vehicle and around a drum 33 to which it is secured at 34. The drum 33 is locked by means of nut 35 to a squared neck 36 of a shaft 37. A wheel 38 secured to the drum 33 by means of screws 39 forms an inner flange for the drum, the wheel 38 being journaled on a sleeve 40 which in turn is keyed to neck 41 of a bracket 42 secured by means of stud bolts 43 to the base 22. A coil spring 44 inside of drum 33 has one end thereof secured at the inside of the drum as at 45 and the other end secured to the sleeve 40 as at 46. As will become apparent from Figures 3 and 4 when the end 32 of cord 31 is pulled the drum 33 will rotate in a direction tending to tighten the spring 44 about the stationary sleeve 41 and when the tension is released the spring 44 will tend to restore the drum 33 to its original position.

The other end of the bracket 42 is closed by a member 47 secured thereto as at 48 and providing the bearing for a wheel 49. The wheel 49 is preferably shaped as shown, having a squared recess 50 to receive the squared end 21 of the stud screws 20 so that roller 19 will be positively secured to the wheel 49 to partake of the same rotation. The wheel 49 is centrally recessed as at 51, providing a bearing for the end of shaft 37 to rotate freely thereon, and a cog 52 projects beyond the average diameter of the wheel 49, the cog 52 overhanging an adjacent washer 53. This washer 53 has a similar L-shaped cog 54 and likewise freely rotatable on shaft 37.

A series of similar washers 53 are provided, freely rotatable on shaft 37 on the same side of a wheel 55 which has also a cog 56 thereon. The wheel 55 does not rotate freely on shaft 37 but, on the contrary, is securely keyed thereto as at 57 so that the wheel 55 for all purposes rotates only as the shaft 37 is rotated. Although the wheel 55 is shown as a separate member from the shaft 37 for convenience of manufacture and assembly, it would be possible to make the wheel 55 with its cog 56 as an integral part of the shaft 37.

Another set of washers 58 having L-shaped cogs 59 is provided on the other side of the wheel 55 and a final washer 60 is placed between the washers 58 and the bracket 42, no cog being provided on this washer, and instead a projection 61 on bracket 42 projects over the edge of washer 60.

In operation the device is mounted in the automobile in the manner which will be obvious from the above description. The cogs 52, 54, 56, and 59 assume the position shown in Figures 3 and 6 when the shade is up. When the driver wishes to lower the rear shade, he merely seizes the end 32 of the cord 31, pulls it down and then slowly allows it to retract to its upper position. As he pulls the end 32 the cord 31 will, through its end 34, rotate the drum, winding up the spring 44 and rotating the shaft 37. The shaft 37 carries with the wheel 55 the cog 56, moving in a down direction as viewed in Figure 6, and as the cog 56 rotates in this direction it will carry with it all the cogs 54 and cog 52, thus rotating the wheel 49 and through the squared recess 50 and squared end 21 of the stud screw 20 similarly rotating the window shade roller 19 to unroll the shade 18.

When the cog 56 has made almost a full revolution, it will be on the other side of the first cog 59 and carry this around one revolution until it projects against the adjacent cog 59, and so on until the final cog 59 hits the projection 61, thus preventing further movement in this direction and the cogs will have taken the position diagrammatically shown in Figure 7. Obviously just enough washers 53 and 58 will be provided allowing the shade to be drawn down until exactly the desired position. When the cogs have reached the position shown in Figure 7, it will not be possible to rotate the drum 33 any further and thus it will not be possible to apply too much tension to the spring 44 or to the spring in the left hand end of roller 19 (not shown). The operator then slowly releases the end 32 of cord 31 which will allow the conventional pawl and ratchet spring arrangement in the left end, (not shown), of roller 19 to hold the shade 18 in the lowered or extended position. Then as he continues to release the cord 31, the spring 44 will restore the drum 33 to its initial position, rotating with the shaft 37 and the wheel 55. This will cause the cog 56 to travel in an upward direction as shown in Figure 7 and it will continue to travel until it has lined up all the cogs 54 and 59 to the position shown diagrammatically in Figure 8.

Thus Figure 6 diagrammatically shows the position of the cogs when the shade is up and the cord end 32 is up. Figure 7 diagrammatically shows the position of the cogs when the shade is lowered and the cord end 32 is still down and Figure 8 diagrammatically shows the position of the cogs when the shade is in its lowered position and the cord 32 is up.

When it is desired to raise the shade the driver pulls the cord end 32 down with a jerk which releases the conventional pawl and ratchet arrangement in the left end of shade 18 and roller 19, causing shade 18 to roll up as the cord end 32 is released. As the shade rolls up the wheel 49 will rotate to carry the cog 52 in up direction, as shown in Figure 8, so that as the wheel 49 continues its rotation, the cogs 54 will be successively picked up and rotated until they all have been restored to the position shown in Figure 6.

When it is desired to roll the shade 18 from the rear seat, or without the use of the cord 31, it may be operated in the conventional manner, the wheel 49 rotating freely in the bearing in the member 47 without affecting the drum 33 for the cogs and washers will merely rotate around the shaft 37.

There is shown in Figure 9 a slightly modified form wherein the bracket 42' containing the same operating mechanism as in the preferred form, is embedded in a hollow end 62 of a roller 19', a drum 33' serving to operate this form in the identical manner as in the preferred form.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A shade control mechanism, comprising a bracket, means rotatably secured in said bracket adapted to be keyed to a shade roller, a shaft, one end of said shaft being rotatably mounted in said means and the other end of said shaft being rotatably secured in said bracket, a drum fixedly secured to one end of said shaft, spring means tending to rotate said drum in one direction, flexible means serving to rotate said drum in the opposite direction, cog means secured on said shaft and a plurality of other cog means rotatably mounted on said shaft, each of said cog means being in the path of movement of the adjacent cog means whereby said shaft may transmit motion to said roller through said cog means.

2. A shade control mechanism, comprising a bracket, a wheel rotatably mounted in one end of said bracket and adapted to be keyed and support a shade roller, a shaft, a bearing in said wheel rotatably supporting one end of said shaft, a bearing in said bracket rotatably supporting the other end of said shaft, a drum keyed to and rotatable with the latter end of said shaft, yielding means tending to rotate said drum in one direction but permitting its rotation in the opposite direction, means for rotating said drum in said opposite direction, a wheel locked to said shaft substantially centrally thereof, a plurality of washer means rotatably mounted on said shaft on each side of said locked wheel, each of said wheels and said washers having a projecting cog overlapping the adjacent wheel or washer member, a projection on said bracket fixed in the path of rotation of the adjacent cog, said wheels and washers comprising a lost motion device whereby said shaft may transmit rotative motion to the window roller only to a limited desired degree.

3. A distant shade control mechanism, comprising a bracket, a wheel rotatably mounted in one end of said bracket and adapted to be keyed and support a shade roller, a shaft, a bearing in said wheel rotatably supporting one end of said shaft, a bearing in said bracket rotatably supporting the other end of said shaft, a drum keyed to and rotatable with the latter end of said shaft, yielding means tending to rotate said drum in one direction but permitting its rotation in the opposite direction, flexible means for rotating said drum in said opposite direction, a wheel locked to said shaft substantially centrally thereof, a plurality of washer means rotatably mounted on said shaft on each side of said locked wheel, each of said wheels and said washers having a projecting cog overlapping the adjacent wheel or washer member, a projection on said bracket fixed in the path of rotation of the adjacent cog, said wheels and washers comprising a lost motion device whereby said shaft may transmit rotative motion to the window roller only to a limited desired degree, a base for said bracket, an arm adjustably secured to said base, pulley means on said arm, and pulley means distantly located from said first pulley means, both said pulley means serving to receive said flexible operating means.

4. A distant shade control mechanism for vehicles, comprising a pulley means located adjacent an operator's position, a pulley means located adjacent a window shade, a window shade control mechanism, a flexible means connecting said window control mechanism through said pulley means to the operator's position, said window shade control mechanism including a drum, said flexible means serving to rotate said drum in one direction only to operate said mechanism, spring means serving to rotate said drum in the opposite direction to restore said flexible means to its initial position, lost motion device in said control mechanism, said lost motion device connecting said drum and the window shade roller and positively limiting the rotation of the said roller to a desired amount.

5. A distant shade control mechanism for vehicles, comprising a pulley means located adjacent an operator's position, a pulley means located adjacent a window shade, a window shade control mechanism, a flexible means connecting said window control mechanism through said pulley means to the operator's position, said window shade control mechanism including a drum, said flexible means serving to rotate said drum in one direction only to operate said mechanism, spring means serving to rotate said drum in the opposite direction to restore said flexible means to its initial position, lost motion device in said control mechanism, said lost motion device connecting said drum and the window shade roller, positively limiting the rotation of the said roller to a desired amount, a shaft keyed to said drum, a wheel keyed to the window shade roller, a bearing in said wheel for said shaft, a wheel keyed to said shaft substantially centrally thereof, a plurality of washers, a bracket, one end of said bracket providing a bearing for said shaft, an overlapping cog on each of said wheels and said washers, each cog being in the path of rotation of the cog on the adjacent member, a projection on said bracket in the path of rotation of the end-most washer adjacent the second bearing.

In testimony whereof I affix my signature.

ROBERT E. COTTON.